May 24, 1927.                                              1,629,830
                         L. L. LYONS
                 SHEET RUBBER SPLITTING MACHINE
                     Filed Oct. 19 1925
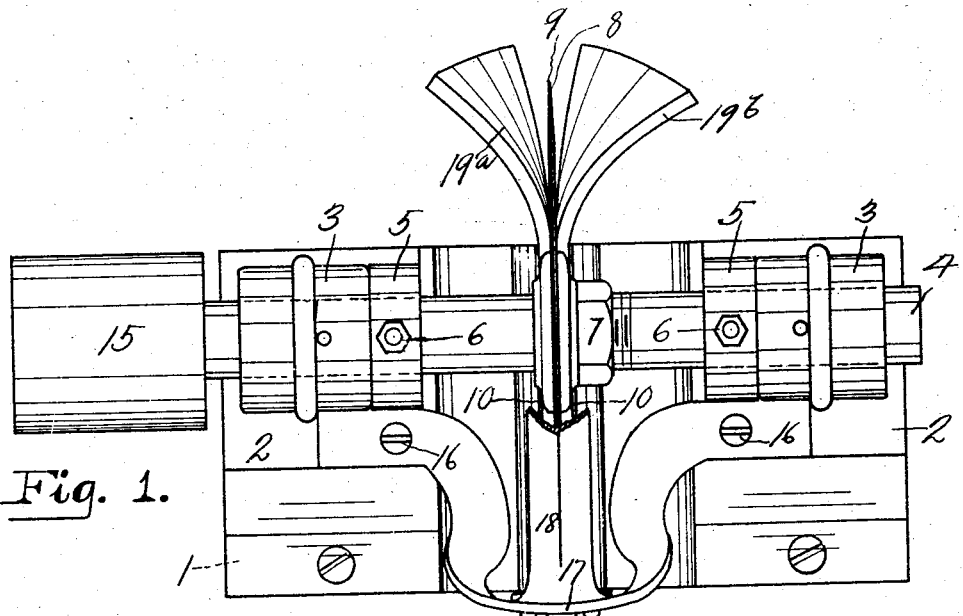
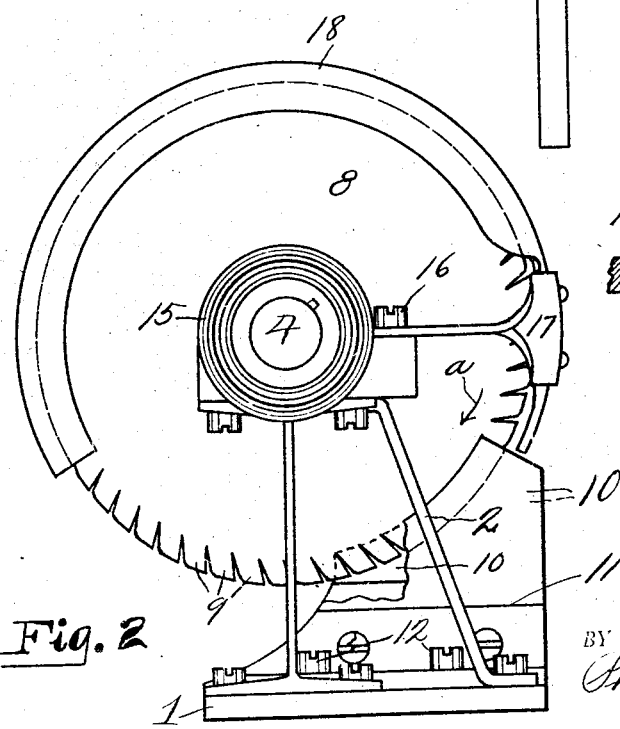
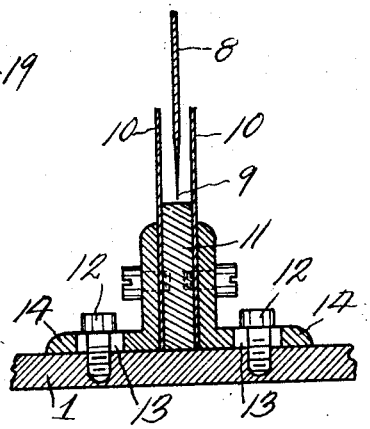
INVENTOR.
L. L. Lyons
BY
    Philip A. H. Jenell
                ATTORNEY.

Patented May 24, 1927.

1,629,830

UNITED STATES PATENT OFFICE.

LEON L. LYONS, OF OMAHA, NEBRASKA.

SHEET-RUBBER-SPLITTING MACHINE.

Application filed October 19, 1925. Serial No. 63,421.

The invention relates to sheet rubber splitting machines, and has for its object to provide a machine for splitting sheet rubber in a quick and uniform manner, and at the same time a machine which is simple in construction, and one which will fill a long demand for a machine that will split sheet rubber uniformly into sheets, for instance for use in shoes.

A further object is to provide a sheet rubber splitting machine comprising a circular toothed knife mounted on an arbor which may be rotated at a high speed, an adjusting clamp member disposed under the blade and attached to a frame on which the blade carrying arbor is mounted, and in which clamp member a piece of sheet rubber may be supported vertically and held rigidly in position and fed against the rotatable blade for severing the sheet of rubber into sections of any desired thickness.

A further object is to provide the rotatable knife with a plurality of teeth in the same plane, and which teeth extend in a direction away from the direction of the rotation of the blade, thereby insuring a clean severing of the sheet of material.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of the machine, showing a portion of the knife guard broken away.

Figure 2 is a side elevation of the machine.

Figure 3 is a detail sectional view transversely through the clamping member and a portion of the bed plate of the machine.

Referring to the drawing, the numeral 1 designates the bed plate of the machine which may be secured to any kind of a support. Extending upwardly from the bed plate at opposite sides thereof are brackets 2, the upper ends of which are provided with bearings 3, in which are rotatably mounted the ends of the arbor 4 of the machine, which arbor is horizontally disposed. Disposed on the arbor 4 and engaging the inner sides of the bearings 3 are collars 5, which are held in position by set screws 6, and which prevent axial movement of the arbor during its rotation. Secured on the arbor 4 by means of a nut 7 is a round cutter knife 8, the periphery of which is sharp and provided with a plurality of spaced teeth 9, which teeth incline or extend in a direction away from the direction of rotation of the blade 8, which rotates in the direction of the arrow $a$, and the object of which direction of inclination of the teeth is to insure a severing of a sheet of rubber disposed between the plates 10 of the adjustable clamping member 11 as distinguished from a severing or sawing operation, therefore it will be seen that the sheet of rubber will be cleanly severed into thin sheets incident to the high rate of rotation of the blade 8, and a sawing action is avoided. The clamping member 11 is secured to the bed plate 1 by means of set screws 12 which extend through elongated apertures 13 in the flanges 14 of the clamp, therefore it will be seen that the clamp 11 may be adjusted sidewise in either direction for varying the thickness of the severed sheets of rubber. One end of the arbor 4 is provided with a pulley 15, over which a belt may extend, and which belt may lead to any suitable source of power, however the greatest efficiency is obtained by a relatively high speed of rotation.

Secured to the upper ends of the brackets 2 at 16 is a U-shaped member 17 which arches the front side of the blade 8 and has secured thereto a segmentally shaped channeled member 18, which extends over the blade 8, especially on its upper side and forms a guard for preventing injury to the operator and preventing the hands of the operator from coming into engagement with the blade.

In operation a sheet of rubber 19 is passed between the plates 10 in a vertical plane and is fed against the rapidly revolving knife 8, and the sharp spaced teeth 9 thereof severs the sheet 19 into sections $19^a$ and $19^b$, as clearly shown in Figure 1, and it will be seen by adjusting the clamping member 11 transversely the thickness of the severed sheets $19^a$ and $19^b$ may be varied, and a sheet can be formed of any thickness desired. The plates 10 extend upwardly at opposite sides of the knife 8 for insuring a positive holding of the sheet during the severing operation.

From the above it will be seen that a sheet rubber splitting machine is provided which is simple in construction may be cheaply manufactured and sold, and one wherein a rotatable round blade is used having a plurality of spaced severing teeth in the plane of each other and which teeth extend in the direction opposite to the direction of rotation of the blade, thereby insuring a clean positive cutting of the rubber sheet.

The invention having been set forth what is claimed as new and useful is:—

A sheet rubber splitting machine comprising a frame, upwardly extending brackets carried by said frame, an arbor rotatably mounted in bearings of said brackets, a toothed knife carried by said arbor, a transversely adjustable clamping member disposed beneath the knife and transversely adjustable in relation to the knife, and plates carried by said clamping member and extending upwardly at opposite sides of the knife and overlapping the knife.

In testimony whereof I affix my signature.

LEON L. LYONS.